United States Patent [19]

Gault

[11] Patent Number: 4,523,489
[45] Date of Patent: Jun. 18, 1985

[54] GROUND DRIVE CONTROL

[75] Inventor: Roger T. Gault, Wild Rose, Wis.

[73] Assignee: Ingersoll Equipment Company, Winnecone, Wis.

[21] Appl. No.: 386,123

[22] Filed: Jun. 7, 1982

[51] Int. Cl.³ .................... G05G 11/00; G05G 1/14
[52] U.S. Cl. ..................... 74/474; 74/481; 74/526
[58] Field of Search ............ 74/473, 474, 479, 481, 74/526; 60/487

[56] References Cited

U.S. PATENT DOCUMENTS

| | | | |
|---|---|---|---|
| B 525,809 | 2/1976 | Hale | 74/482 |
| 1,468,114 | 9/1923 | Kendrick | 74/479 |
| 3,181,388 | 5/1965 | Riddy | 74/478 |
| 3,537,328 | 11/1970 | Allen | 74/481 |
| 4,040,306 | 8/1977 | Jensen | 74/474 |
| 4,068,733 | 1/1978 | Simmons et al. | 74/481 |
| 4,085,833 | 4/1978 | Papasideris | 74/479 |
| 4,086,824 | 5/1978 | Johnson | 74/481 |
| 4,156,370 | 5/1979 | Callaghan | 74/481 |
| 4,197,761 | 4/1980 | Volpi | 74/481 |
| 4,215,547 | 8/1980 | Molby | 60/487 |
| 4,346,617 | 8/1982 | Schroeder et al. | 74/481 |
| 4,369,856 | 1/1983 | Nudd | 74/479 |

FOREIGN PATENT DOCUMENTS

| | | | |
|---|---|---|---|
| 778605 | 2/1968 | Canada | 74/481 |
| 927070 | 4/1955 | Fed. Rep. of Germany | 74/481 |
| 1104358 | 4/1961 | Fed. Rep. of Germany | 74/481 |
| 1506061 | 5/1969 | Fed. Rep. of Germany | 74/479 |
| 1550684 | 7/1969 | Fed. Rep. of Germany | 60/53 R |
| 2239540 | 2/1975 | Fed. Rep. of Germany | 74/479 |
| 534831 | 4/1922 | France | 60/487 |
| 667039 | 10/1929 | France | 60/487 |
| 1198389 | 12/1959 | France | 74/479 |
| 143860 | 11/1981 | Japan | 60/487 |
| 978661 | 12/1964 | United Kingdom | 60/487 |
| 1228135 | 4/1971 | United Kingdom | 60/487 |

Primary Examiner—Allan D. Herrmann
Attorney, Agent, or Firm—Cullen, Sloman, Cantor, Grauer, Scott & Rutherford

[57] ABSTRACT

A drive control assembly including a rocking foot pedal and a rotatable control lever for effecting forward and reverse motion of a machine. The control lever is operably connected to a rotatable selector plate for setting the direction of machine movement. The foot pedal is operably connected to the rotatable selector plate for controlling the speed of machine movement in either the forward or reverse direction. The rotatable selecor plate includes a slot having directional positions for forward, neutral, and reverse directional control, respectively. The foot pedal is connected to a pin in the selector plate slot by an actuating linkage and the control lever is connected to the same pin by a coupling element. The selector plate pin is movable in the slot from a neutral position to either a reverse or forward directional position in response to the shifting of the control lever. After the control lever is shifted to a directional position, it remains stationary while the joint formed between the selector plate pin and the ends of the coupling element and actuating linkage moves along the selector plate slot in response to downward depression of the foot pedal. The movement of the joint between the selector plate pin, coupling element and actuating linkage along the selector plate slot does not affect the position of the control lever.

1 Claim, 3 Drawing Figures

GROUND DRIVE CONTROL

BACKGROUND OF THE INVENTION

The present invention relates to machines having a hydrostatic transmission such as a tractor, and more particularly, to a ground drive control assembly having a combined rocking foot pedal and shift assembly for effecting forward and reverse motion of the machine.

It is conventional to provide tractors and similar machines with hydrostatic transmissions for controlling the speed, direction, and pulling power of the tractor. Tractors of this type have also been provided with a rotatable control lever which operates in cooperation with a rocking foot pedal. The control lever is rotated in one direction for forward motion of the machine and is rotated in the opposite direction for reverse motion of the machine. The speed of the tractor in either direction is proportional to the amount the foot pedal is depressed. A ground drive control assembly of the type just described is illustrated in U.S. Pat. No. 4,040,306, assigned to the assignee of the present invention.

There is a disadvantage to the ground drive control assembly shown in the aforementioned patent. When the foot pedal is depressed for increasing speed, the rotatable control lever tends to move toward a neutral position which gives the operator the misconception that the control lever is not functioning properly. Thus, there has been a need for a drive control assembly which overcomes this disadvantage while providing improved operation as compared to prior constructions.

SUMMARY OF THE INVENTION

The drive control assembly of the present invention is particularly adapted to machines having a hydrostatic transmission such as a tractor. The drive control includes a rocking foot pedal and rotatable control lever for effecting forward and reverse motion of the machine. The control lever is operably connected to a selector plate for setting the direction of machine movement. In operation, the desired direction of movement is set with the rotatable control lever and the speed of movement in the selected direction is proportional to the amount the foot pedal is depressed.

The selector plate is rotatably mounted to the tractor frame and includes a slot having directional positions for forward, neutral, and reverse directional control, respectively. The rotational movement of the foot pedal is transmitted to the selector plate by an actuating linkage including a pin which is movable in the selector plate slot. The control lever is also connected to the selector plate pin by a coupling element, and the selector plate pin is movable in the slot from a neutral position to either a reverse or forward direction position in response to the rotation of the control lever.

The actuating linkage between the rotatable foot pedal and selector plate includes a universal joint to prevent binding as the selector plate pin moves in the directional position slot. A spring is also provided for returning the foot pedal to a neutral or non-depressed position if the operator, for example, removes his foot from the pedal.

The control lever coupling element is connected at one end to the selector plate pin and its other end is connected to a bracket on the control lever by a universal joint. The control lever is rotatably mounted in a tractor frame member and includes a stop pin which moves into engagement with stop abutments when the control lever is rotated to either a forward or reverse directional control position.

To shift the transmission into forward, the operator rotates the control lever until its stop pin engages one of the stop abutments. This, in turn, causes the selector plate pin to be displaced by the coupling element to a directional position within the selector plate slot which sets a control valve for a forward drive mode. Thereafter, depression of the foot pedal pulls on the actuating linkage which rotates the selector plate thereby stroking the control valve to increase the speed of movement of the machine in the selected direction.

As the foot pedal is being depressed, the control lever remains stationary while the joint formed by the selector plate pin and the ends of the coupling element and actuating linkage moves along a portion of the selector plate slot in response to downward depression of the foot pedal. The movement of the joint between the selector plate pin, coupling element, and actuating linkage does not affect the position of the control lever. Thus, the control lever does not move toward the neutral position when the foot pedal is being depressed which prevents the misconception that the control lever is not functioning properly.

To shift the hydrostatic transmission into reverse, the operator rotates the control lever in an opposite direction until the stop pin engages the other stop abutment. This causes the selector plate pin to be displaced by the control lever coupling element to the directional position within the selector plate slot which corresponds to a reverse direction mode. Thereafter, depression of the foot pedal pulls on the actuating linkage which rotates the selector plate thereby stroking the hydrostatic transmission control valve to increase the speed of movement in the reverse direction. Again, the control lever remains stationary as the foot pedal is being depressed while the joint formed between the selector plate pin, coupling element, and actuating linkage moves along another portion of the selector plate slot.

Other advantages and meritorious features of the ground drive control assembly of the present invention will be more fully understood from the following description of the preferred embodiment, the appended claims, and the drawings, a brief description of which follows.

DETAILED DESCRIPTION OF THE INVENTION

Figure 1:
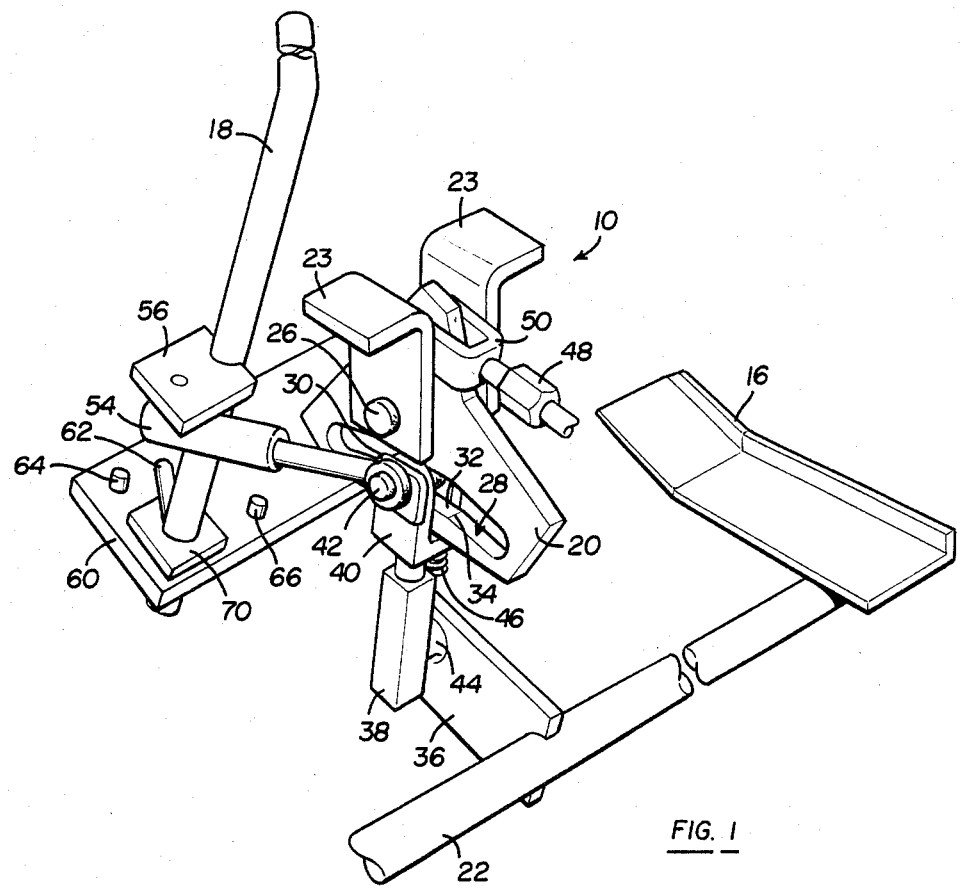
FIG. 1 is a perspective view of the drive control including the combined rocking foot pedal and rotatable control lever.
Figure 2:
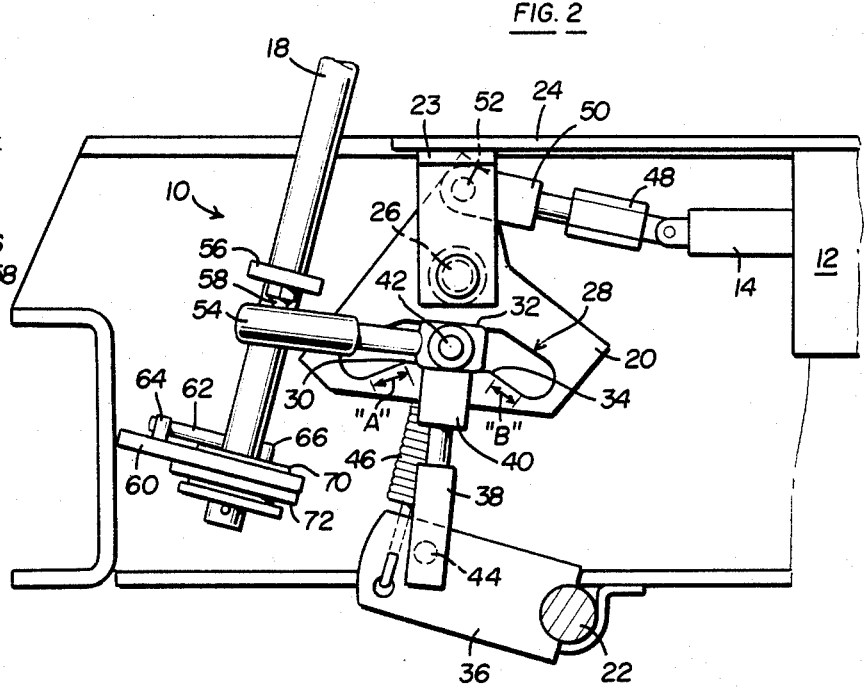
FIG. 2 is a side elevational view of the drive control of the present invention.

Referring to FIGS. 1 and 2, there is shown a ground drive control assembly 10 for controlling a transmission control valve 12 which can be used, for example, for actuating a hydrostatic transmission of a type well-known in the art. The control valve 12 has a spool 14 which is movable or shiftable through various positions corresponding to various drive modes including forward, reverse and neutral. Control valves such as valve 12 are well-known in the art and function to direct hydraulic fluid depending upon the position of spool 14 to place the hydrostatic transmission (not shown) in forward or reverse drive or neutral, respectively.

The drive control assembly includes a rocking foot pedal 16 and a rotatable control lever 18 for effecting forward and reverse motion of the machine. Control lever 18 is operably connected to selector plate 20 for setting the direction of machine movement. Foot pedal 16 is operably connected to shaft 22 for controlling the speed of machine movement in either the forward or reverse direction. In operation, the desired direction of movement is set by shifting lever 18, and thereafter, the speed of movement in either the forward or reverse direction is proportional to the amount the foot pedal 16 is depressed.

Selector plate 20 is rotatably mounted between brackets 23 on tractor frame 24 by means of pin 26. Plate 20 has a slot 28 with directional positions 30, 32 and 34 for forward, neutral, and reverse directional control, respectively.

The rotational movement of foot pedal 16 is transmitted to selector plate 20 by actuating links 36 and 38, respectively. Link 36 is welded or otherwise secured to shaft 22 and link 38 includes a yoke end 40 which is connected to selector plate slot 28 by pin 42. Pin 42 is shown at the neutral directional position 32 in FIGS. 1-3, and it is movable in slot 28 from the neutral position to either the reverse direction position 34 or the forward direction position 32 in response to the shifting of lever 18.

Actuating link 36 is rotatably connected to link 38 by a universal joint 44 to prevent binding between the links as pin 42 moves in slot 28. A spring 46 is connected between actuating link 36 and bracket pin 26 for returning foot pedal 16 to an unactuated position when it is released by the operator.

Rotatable selector plate 20 is connected to control valve spool 14 by means of a coupling linkage 48. Linkage 48 is fixed to spool 14 at one end and includes a yoke 50 at its other end which is connected to selector plate 20 by pin 52. Thus, when control lever 18 is rotated, pin 42 is simultaneously moved to a corresponding directional position in plate slot 28 thereby establishing the selected direction of movement for the machine. Thereafter, depression of foot pedal 16 rotates plate 20 either clockwise or counterclockwise which further strokes control valve 12 to increase the speed of movement in the selected direction.

Control lever 18 is connected to selector plate pin 42 by a coupling element 54. Coupling element 54 is coupled at one end with pin 42 and its other end is connected to a bracket 56 on lever 18 by a universal joint 58. The lower end of lever 18 is rotatably mounted in frame member 60 and a stop pin 62 on lever 18 moves into engagement with stop abutments 64 and 66 when control lever 18 is rotated to either a forward or reverse directional control position. The rotational location set for control lever 18 is maintained by friction disc 70 and belleville spring 72.

Figure 3:
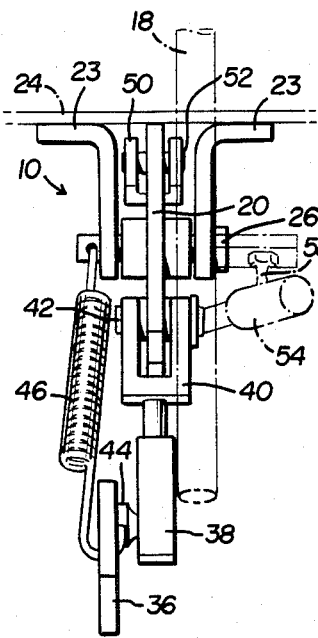
FIG. 3 is an end view of the drive control illustrated in FIG. 2.

Referring to FIGS. 1-3 which illustrate the drive control assembly 10 set at neutral, the operation of the drive control will be described. To shift the transmission into forward, the operator rotates control lever 18 until stop pin 62 engages stop abutment 66. This, in turn, causes selector plate pin 42 to be displaced by coupling element 54 to the directional position 30 within slot 28 which sets control valve 12 for a forward drive mode. Thereafter, depression of foot pedal 16 pulls on linkage 36 and 38 which rotates selector plate 20 counterclockwise thereby stroking control valve 12 to increase the speed of movement in the forward direction.

As foot pedal 16 is being depressed, control lever 18 remains stationary while the joint formed by pin 42 and the ends of coupling element 54 and link 38 moves along slot portion "A" (FIG. 2) in response to downward depression of foot pedal 16. Universal joints 58 and 44 permit such independent movement by the joint formed between pin 42 and the ends of element 54 and link 38 without affecting the position of control lever 18. This prevents any movement of control lever 18 toward the neutral position when foot pedal 16 is depressed thereby preventing the misconception that the control lever 18 is not working properly.

To shift the control valve 12 and hydrostatic transmission into reverse, the operator rotates control lever 18 until stop pin 62 engages stop abutment 64. This, in turn, causes selector plate pin 42 to be displaced by coupling element 54 to the directional position 34 within slot 28 which sets control valve 12 for a reverse drive mode. Thereafter, depression of foot pedal 16 pulls on linkage 36 and 38 which rotates selector plate 20 clockwise thereby stroking control valve 12 to increase the speed of movement in the reverse direction.

Again, control lever 18 remains stationary as foot pedal 16 is being depressed while the joint formed by pin 42 and the ends of coupling element 54 and link 38 moves along slot portion "B" (FIG. 2) in response to downward depression of foot pedal 16. The movement of the joint between pin 42, coupling element 54, and link 38 along slot portion "B" is independent of and does not affect the position of control lever 18. Thus, control lever 18 does not move toward the neutral position when foot pedal is being depressed which prevents the misconception that the control lever 18 is not functioning properly.

It will be apparent to those skilled in the art that the foregoing disclosure is exemplary in nature rather than limiting, the invention being limited only by the appended claims.

I claim:

1. A ground drive control assembly for a machine having a transmission control means which is shiftable through positions corresponding to various drive modes including forward, reverse and neutral, said ground drive control assembly comprising:

a rotatable control lever operably connected to a rotatable selector means for setting the direction of machine movement and a depressable foot pedal means operably connected to said selector means for controlling the speed of machine movement in a selected direction, said rotatable control lever including a stop pin extending therefrom which is movable into engagement with stop abutments when said control lever is rotated to a position corresponding to either forward or reverse directional control;

said rotatable selector means connected to said transmission control means and including a slot having directional positions for forward, neutral and reverse directional control, and pin means slidably movable within said slot;

said foot pedal means connected to said pin means by an actuating linkage, said actuating linkage including a first link which is secured to a member that is rotatable in response to depression of said foot pedal means, first universal joint means connecting one end of a second link to said first link for universal movement of said second link relative to said first link, said second link connected at its other end to said pin means, and spring means connected between said first link and said rotatable selector means;

said control lever connected to said pin means by a coupling element, second universal joint means connecting one end of said coupling element to said control lever for universal movement of said coupling element relative to said rotatable control lever, and said coupling element connected at its other end to said pin means; and a movable joint being formed by the connection between said pin means, said other end of said coupling element, and said other end of said second link, said joint being shifted within said slot in response to rotation of said control lever to a selected directional position and thereafter, depression of said foot pedal means causing said selector means to rotate while said joint moves along a portion of said slot without affecting the position of said control lever.

* * * * *